United States Patent [19]

Leonard et al.

[11] Patent Number: 5,533,749
[45] Date of Patent: Jul. 9, 1996

[54] APPARATUS FOR IMPROVED DETACHMENT OF THE DEPLOYMENT DOOR OF AN AIRBAG ASSEMBLY

[75] Inventors: Timothy J. Leonard, Stuttgart, Germany; Daniel W. Anderson, South Weber, Utah

[73] Assignee: Morton International, Inc., Chicago, Ill.

[21] Appl. No.: 524,896

[22] Filed: Sep. 7, 1995

[51] Int. Cl.⁶ .................................. B60R 21/16
[52] U.S. Cl. ........................ 280/728.3; 280/732
[58] Field of Search ................. 280/728.30, 728.1, 280/732

[56] References Cited

U.S. PATENT DOCUMENTS

| | | | |
|---|---|---|---|
| 3,708,179 | 1/1973 | Hulten | 280/150 AB |
| 4,105,223 | 8/1978 | Oda et al. | 280/752 |
| 4,456,640 | 6/1984 | Nishihara | 428/31 |
| 4,474,391 | 10/1984 | Matsuno et al. | 280/752 |
| 4,668,004 | 5/1987 | Tsunoda et al. | 296/70 |
| 4,759,568 | 7/1988 | Paefgen et al. | 280/732 |
| 4,893,833 | 1/1990 | DiSalvo et al. | 280/732 |
| 4,895,389 | 1/1990 | Pack, Jr. | 280/732 |
| 4,964,653 | 10/1990 | Parker | 280/732 |
| 4,989,896 | 2/1991 | DiSalvo et al. | 280/732 |
| 4,989,897 | 2/1991 | Takada | 280/743 |
| 4,991,870 | 2/1991 | Beusterien et al. | 280/732 |
| 5,013,065 | 5/1991 | Kreuzer | 280/743 |
| 5,035,444 | 4/1991 | Carter | 280/732 |
| 5,080,393 | 1/1992 | Bauer | 280/732 |
| 5,082,310 | 1/1992 | Bauer | 280/732 |
| 5,096,221 | 3/1992 | Combs et al. | 280/732 |
| 5,154,444 | 10/1992 | Nelson | 280/732 |
| 5,195,776 | 3/1993 | Sakakida et al. | 280/732 |
| 5,217,244 | 6/1993 | Bauer | 280/728 |
| 5,256,354 | 10/1993 | Chadwick | 264/119 |
| 5,280,946 | 1/1994 | Adams et al. | 280/728 A |
| 5,292,150 | 3/1994 | Watanabe et al. | 280/728 B |
| 5,308,110 | 5/1994 | Kokeguchi | 280/728 A |
| 5,312,130 | 5/1994 | Baba | 280/728 B |
| 5,375,876 | 12/1994 | Bauer et al. | 280/728.3 |
| 5,407,225 | 4/1995 | Cooper | 280/728.3 |
| 5,466,000 | 11/1995 | Leonard et al. | 260/728.3 |

FOREIGN PATENT DOCUMENTS

| | | | |
|---|---|---|---|
| 3136948 | 6/1991 | Japan | 280/728.3 |

*Primary Examiner*—Eric D. Culbreth
*Assistant Examiner*—Christopher Ellis
*Attorney, Agent, or Firm*—George W. Rauchfuss; Gerald K. White

[57] ABSTRACT

A deployment door positioned in a panel of a vehicle is opened by an airbag module located rearwardly of the deployment door. Apparatus is provided for detaching the door at a tear region from the remaining area of the panel, thereby providing a doorway outlet through the panel for the passage of an inflating airbag. A tear structure has a distal end in the form of an outwardly rounded bump cutter positioned and extending outwardly toward the tear region and a front surface of the panel, thereby reducing the distance of travel of the cutter through the foam in the panel to the tear region which reduces the force required to tear the foam. The outwardly rounded bump of the tear structure in one embodiment may be in the form of a closed loop. The deployment door may be completely contained within and surrounded by the panel before opening or may have one edge bordering on the edge of the panel.

18 Claims, 2 Drawing Sheets

APPARATUS FOR IMPROVED DETACHMENT OF THE DEPLOYMENT DOOR OF AN AIRBAG ASSEMBLY

FIELD OF THE INVENTION

This invention relates to motor vehicle airbag deployment systems, and more particularly to apparatus for detaching a deployment door in a panel of the vehicle by an inflating airbag which apparatus reduces both the force required, as well as the fragmentation caused in detaching the deployment door from the panel.

BACKGROUND OF THE INVENTION

Many airbag restraint systems have a panel containing an integral deployment door which covers; and conceals an airbag assembly in an internal portion of a vehicle, e.g., a vehicle instrument panel, door panel, or side panel. The integral deployment door is caused to open during the inflation of the airbag to provide a doorway outlet through the panel by which the inflating airbag deploys into the vehicle passenger compartment. The panel includes a tear seam or region serving as a boundary or edge of the deployment door and which integrally joins the deployment door with the remaining areas of the panel. During airbag deployment, the deployment door is detached or separated from the remaining panel along the tear region for opening the door outlet and thus permitting the inflating airbag to enter the passenger compartment of the vehicle to protect its occupants.

In order to cause the deployment door to open, a tear means, such as a cutter and/or ripper, is generally aligned with the tear region. The inflating force of a deploying airbag drives the tear means through the tear region to separate the deployment door from the rest of the panel. The deployment door is generally hinged along an edge thereof or tethered to an interior substrate of the vehicle, such as the instrument panel, to prevent the total release of the door into the passenger compartment since flying objects and debris in the passenger compartment must be avoided for the passenger's safety.

The panel in which the deployment door is contained normally comprises a vinyl outer layer separated by foam core from a metal or thermoplastic substrate. Accordingly, the tear means must tear through the foam core and vinyl covered surface of the panel in order to open the deployment door. Such action will generally cause fragmentation of the foam which fragments can be expelled into the passenger compartment. The thicker the region between the tear means and the tear seam, the greater the force which will be required to open the deployment door and the greater the amount of debris that can be created in the deployment process.

SUMMARY OF THE INVENTION

Accordingly, it is an object of this invention to provide a new and improved apparatus for detaching a deployment door from an integral panel of an airbag assembly which reduces the amount of debris discharged into a vehicle passenger compartment on the deployment of the deployment door.

Another object of this invention is to provide a new and improved apparatus for detaching a deployment door from an integral panel of an airbag assembly which reduces the force required to open the deployment door.

Still another object of this invention is to provide a new and improved apparatus for detaching a deployment door from an integral panel of an airbag assembly which prevents or substantially eliminates the inflating airbag from catching on the deployment door during deployment.

In carrying out this invention in one of its aspects, an improved apparatus for detaching the deployment door from an integral panel of an airbag installation is provided wherein the panel is one having a foam core which has a front surface exposed to a passenger compartment in the vehicle and a rear surface behind which an airbag module is disposed. The panel has at least one tear region associated with the deployment door which is integral with the panel and wherein during deployment of an airbag from an airbag module located rearwardly from the deployment door, the deployment door becomes detached at the tear region from the remaining area of the panel for providing a doorway outlet through the panel for accommodating the passage of an inflating airbag during its deployment into the passenger compartment.

In one illustrative embodiment of the invention, tear means are provided having a distal end thereon which extends from the rear substrate surface of the door and is also part of said rear surface of the panel prior to the deployment of said door, said distal end of said tear means having a rounded bump cutter thereon which is curved generally convexly and extends outwardly into the foam core toward the tear region for reducing the distance between the tear means and the tear region, thereby reducing the amount of foam to be torn, and accordingly the amount of force required for the opening of the deployment door. In another embodiment, the rounded bump cutter comprises a closed loop on the distal end of the tear means to prevent the airbag from catching on the door during deployment. The deployment door may be formed completely within the panel or may extend to one edge of the panel, which latter arrangement would additionally reduce the amount of debris generated during deployment due to the fact that the edge of the door extending to the end of the panel would not have to be cut.

BRIEF DESCRIPTION OF THE DRAWINGS

The invention together witch other objects, features, aspects and advantages thereof will be more clearly understood from the following description taken in connection with the accompanying drawing in which like elements contain the same reference numerals throughout the various views.

DESCRIPTION OF THE PREFERRED EMBODIMENTS

Figure 1:
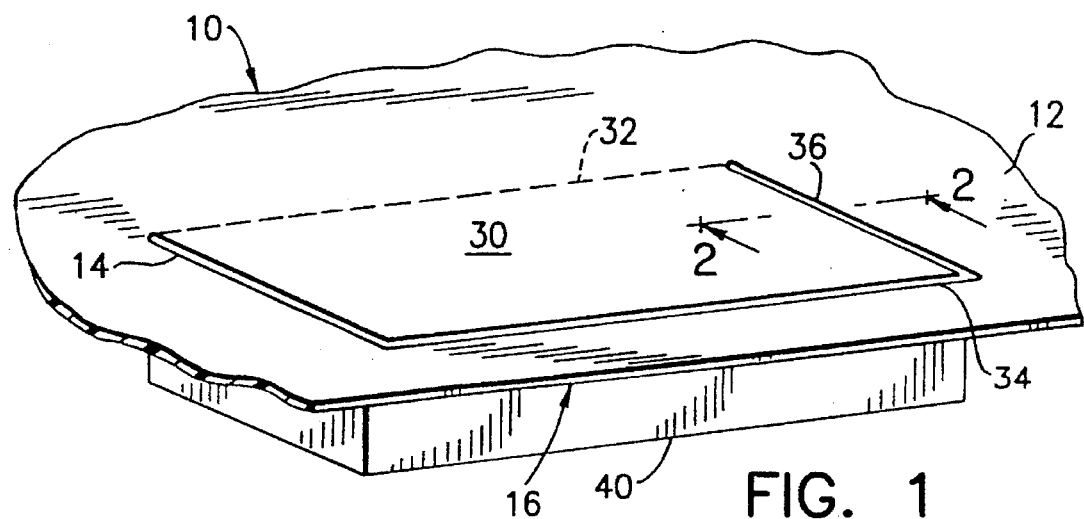
FIG. 1 illustrates a top perspective view of an airbag installation showing a door within a panel having an airbag module positioned behind the rear of the door.

In order to better understand the invention, reference is made to FIG. 1 which shows a deployment door 30 formed in a molded panel 10 which is delineated by a door hinge 32 along a first side, which hinge 32 is conventional and functions to retain the door 30 on the panel 10 on deployment, additional tear seam 34 which is parallel to the hinge 32, and parallel side tear seams 14 and 36. In the configuration of FIG. 1, the door 30 is completely within the panel 10, which is not necessary as will be explained later. The door 30 has an airbag module 40 located behind the rear surface substrate 16 of the panel 10, and thus is positioned rearwardly from the deployment door 30.

Figure 2:
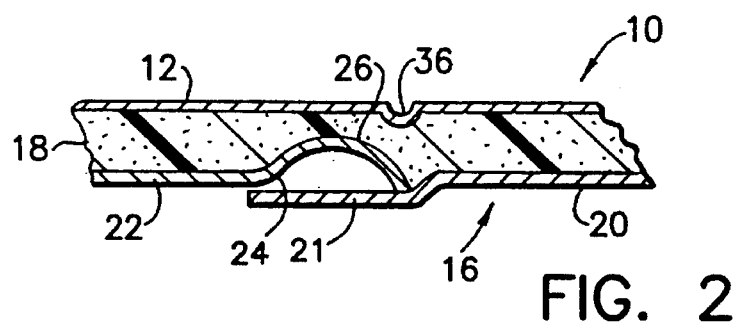
FIG. 2 is a partial cross-sectional view taken along line 2—2 of FIG. 1 showing a panel having an integral door and tear means according to the invention.

Referring now to FIG. 2, the molded panel 10 comprises a front surface layer 12 which is provided with a tear region or seam 36 and a rear surface substrate 16 with a plastic foam layer or core 18 sandwiched between the front surface layer 12 and the rear surface substrate 16. The type of materials used in forming the panel do not constitute part of the present invention, and any material suitable for forming such a panel may be used. For example, the front surface layer 12, generally referred as the "skin," may be a vinyl material, the core 18 may be a plastic foam and the rear substrate 16 may comprise an instrument panel substrate 20 and a door panel substrate 22. The door panel substrate and the instrument panel substrate may be made of thermoplastic and/or metal.

The rear surface substrate 16 of the panel 10 is formed by a combination of the instrument panel substrate 20 having a shelf 21 extending therefrom on which the distal end 24 of the door substrate 22 rests.

In order to detach the deployment door 30 (FIG. 1) from the remainder of the panel 10 during deployment of an airbag from the airbag module 40 for opening an doorway outlet through the panel 10, a tear means in the form of a rounded bump cutter extends generally convexly outwardly on a top or outer surface of said rounded bump cutter and concavely outwardly on a bottom or inner surface of said rounded bump cutter toward the tear region or seam 36 of the front surface 12 of the panel 10. This front surface or skin layer 12 is exposed to a passenger compartment of the motor vehicle in which it is mounted. During deployment of an airbag from the module 40 (see FIG. 1), the inflating airbag (not shown) pushes against the door substrate 22, thereby advancing the cutter means, in the form of the rounded bump cutter 26 on the distal end 24 of the door substrate 22 toward tear seam 36, causing the cutter 26 to cut foam core 18 and the front surface layer or skin 12 at the tear region or seam 36. With reference to FIG. 1, a similar arrangement causes the aforesaid action to simultaneously take place along tear seams 14 and 34, thereby detaching the deployment door 30 from the rest of the panel 10 while remaining hinged thereto at the hinge 32. The inflating airbag from the airbag module 40 then deploys through the open door in the panel 10.

With reference to the embodiment of FIG. 2, the rounded bump cutter 26 decreases the distance the cutter 26 must travel to reach the tear seam 36, thereby requiring less force to cut through the foam core 18 to open the deployment door 30. In addition, since the amount of foam to be torn or cut is reduced by the rounded bump cutter 26, less debris is created. Also, the smooth rounded edge of the rounded bump cutter 26 creates less fragmentation of the foam on deployment.

Figure 4A:
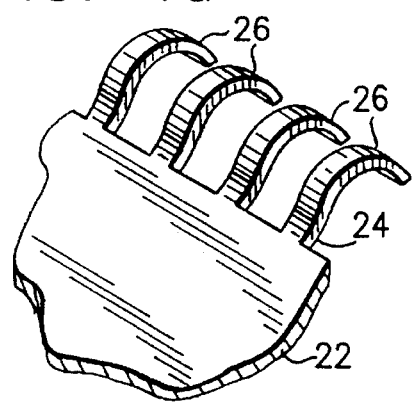
FIG. 4a shows one form of the tear means in FIG. 2 in which cutters are spaced along the distal end of the door substrate.
Figure 4B:
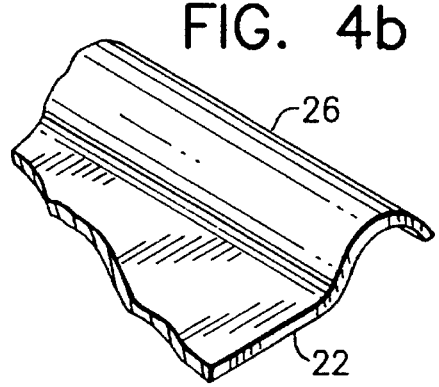
FIG. 4b shows another form of the cutter of FIG. 2 in which the cutter means is continuous and extends the length of the distal end of the door substrate.

As will be seen in FIG. 4a, the rounded bump cutter 26 may be configured as a plurality of spaced rounded bump cutters 26 along the distal end 24 of the door panel substrate 22, or as a single continuous cutter 26 as shown in FIG. 4b.

Figure 3:
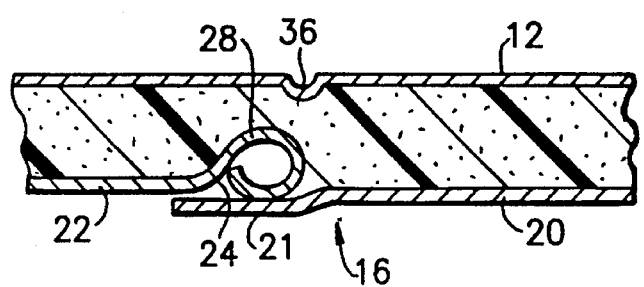
FIG. 3 is a partial cross-sectional view of a panel similar to FIG. 2 showing another embodiment of a tear means in accordance with the present invention.

FIG. 3 shows another embodiment of the invention in which the rounded bump cutter 26 is formed in a closed loop to provide a closed loop cutter 28. The closed loop cutter 28 prevents the inflating airbag from catching on the deployment door 30 while still reducing fragmentation of the foam 18 or the vinyl skin of the front surface layer 12.

Figure 5A:
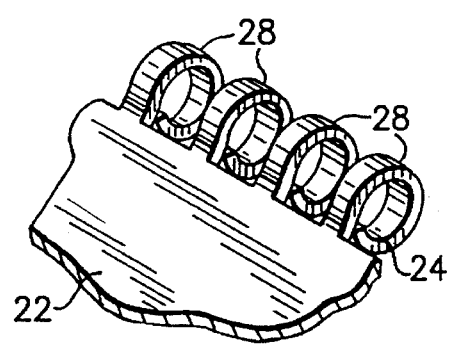
FIG. 5a shows the form of the cutter means illustrated in FIG. 3 spaced along the distal end of the door substrate.
Figure 5B:
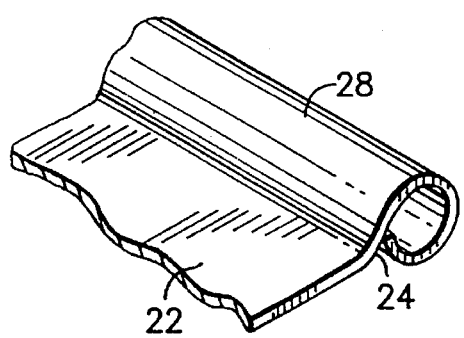
FIG. 5b shows another form of the cutter means illustrated in FIG. 3 in which the cutter means is continuous and extends the length of the distal end of the door substrate.

As shown in FIG. 5a, the closed loop cutter 28 may comprise a plurality of closed loop cutters 28 spaced along the distal end 24 of the door panel substrate 22 or may be a continuous single closed loop cutter 28 extending along the entire length of the distal end 24 of the door panel substrate 22, as shown in FIG. 5b.

The new and improved rounded-end or generally convex outwardly extending cutters 26 and 28 may be employed in the door arrangement shown in FIG. 1 in which the door 30 has three tear means 14, 34 and 36 and is hinged at door hinge 32. The cutters 26 or 28 follow the tear seams 14, 34 and 36 to open the door 30 on the deployment of the airbag (not shown) from the adjacent airbag module 40.

Figure 6:
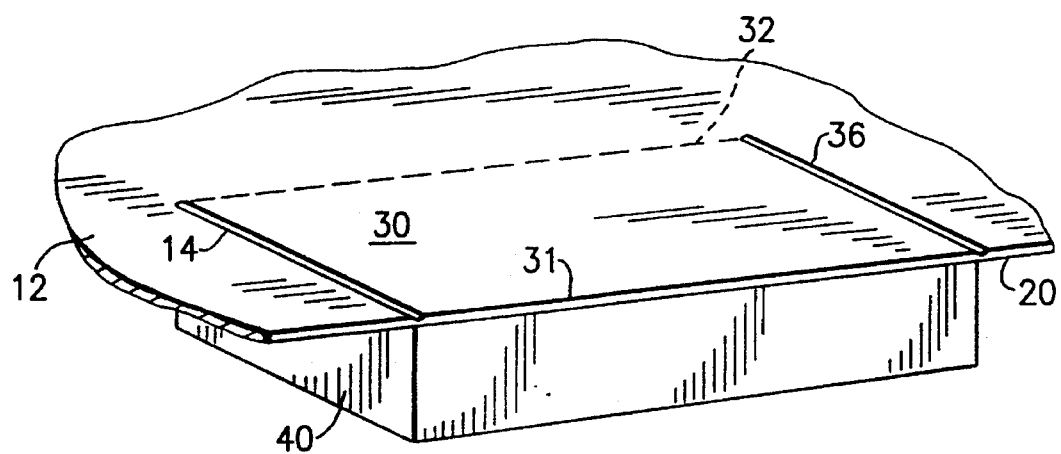
FIG. 6 illustrates a partial airbag installation similar to FIG. 1 with the deployment door extending to one edge of the panel, thus reducing the number of tear seams required in the embodiment of FIG. 1.

In the door arrangement in FIG. 6, only two tear seams 14 and 36 are used along the short sides of the door 30 and extend to the edge of the instrument panel 10 with the forward edge 31 of the door 30 being free and not requiring any cutting structure. The benefit of the door configuration in FIG. 6 is that the cutter need only extend along the sides of the door defined by the tear seams 14 and 36 resulting in less cutting and fragmentation, as well as reducing the required cutting structure by eliminating one of the tear seams when compared to the embodiment of FIG. 1.

Accordingly, an apparatus is provided for detaching the deployment door of an airbag installation which reduces the tear region thickness which must be cut in a skin and foam airbag deployment door as well as the force required to deploy the deployment door and a reduction of the fragmentation produced by such a deployment.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. In a vehicle airbag installation wherein a panel has a front surface layer exposed to a passenger compartment in the vehicle and a rear surface substrate with a foam core therebetween, said rear surface substrate having an airbag module positioned behind it, and wherein the panel has at least one tear region therein associated with a deployment door which is integral with the panel and wherein during deployment of an airbag from the airbag module located rearwardly from the deployment door, the deployment door becomes at least partially detached at the tear region from the remaining area of the panel for providing a doorway outlet through the panel for accommodating the passage of an inflating airbag during deployment of the airbag into the passenger compartment;

apparatus for detaching the deployment door at the tear region comprising:

at least one tear means having a distal end thereon, said distal end of said tear means extending from the rear surface substrate and being an extension of said rear surface of said panel prior to the deployment of said door, said distal end of said tear means having a cutter including a rounded end on said distal end wherein said rounded end is configured as a rounded bump extending toward the tear region and the front surface of the panel generally convexly outwardly on an outer surface of said rounded bump and generally concavely outwardly on an inner surface of said rounded bump.

2. In a vehicle airbag installation as claimed in claim 1 wherein the distal end of the tear means extending from the rear surface of the panel extends from a part of the rear surface substrate comprising the deployment door.

3. In the vehicle airbag installation as claimed in claim 2 wherein said rounded bump on the distal end of said tear means is arranged in a closed loop.

4. In the vehicle airbag installation as claimed in claim 2 wherein said deployment door is hinged within said panel along one side thereof and three remaining sides of said door are defined by said tear region whereby said door before deployment is positioned completely inside and surrounded by said panel.

5. In the vehicle airbag installation as claimed in claim 2 wherein said deployment door is hinged within said panel along a first side thereof and extends to an edge of said panel on a second side opposite and parallel to said first side of said door with two remaining opposite sides of said deployment door being defined by said tear region whereby said door before deployment is integral with and borders on at least one edge of said panel.

6. In the vehicle airbag installation as claimed in claim 2 wherein said tear means comprises a plurality of said cutters spaced along said distal end of said tear means.

7. In the vehicle airbag installation as claimed in claim 3 wherein said tear means comprises a plurality of said cutters spaced along said distal end of said tear means.

8. In the vehicle airbag installation as claimed in claim 4 wherein said tear means comprises a plurality of said cutters spaced along said distal end of said tear means.

9. In the vehicle airbag installation as claimed in claim 2 wherein said rounded bump on the distal end of said tear means is arranged in a substantially continuous rounded configuration.

10. In the vehicle airbag installation as claimed in claim 3 wherein said rounded bump on the distal end of said tear means is arranged in a substantially continuous rounded configuration.

11. In the vehicle airbag installation as claimed in claim 4 wherein said rounded bump on the distal end of said tear means is arranged in a substantially continuous rounded configuration.

12. In the vehicle airbag installation as claimed in claim 2 wherein said rounded bump on the distal end of said tear means is configured in a substantially continuous closed loop.

13. In the vehicle airbag installation as claimed in claim 3 wherein said rounded bump on the distal end of said tear means is configured in a substantially continuous closed loop.

14. In the vehicle airbag installation as claimed in claim 4 wherein rounded bump on the distal end of said tear means is configured in a substantially continuous closed loop.

15. An automotive panel assembly with an integral airbag deployment door define in a portion of said panel for deployment of an airbag from an airbag module positioned behind said panel and aligned with the deployment door, comprising:

a) a panel front surface layer for facing an interior of an automotive compartment, b) a panel rear surface substrate, c) a foam core intermediate said panel front surface layer and said panel rear surface substrate, d) said panel having a tear region associated therewith for defining the integral deployment door aligned with the airbag module, said tear region being tearable during inflation and deployment of the airbag from the airbag module whereby the deployment door becomes at least partially detached from the panel at the tear region for accommodating passage of the inflating airbag during its deployment into the automotive passenger compartment, e) tear means located on said panel rear surface substrate for cutting the foam core and the panel front surface layer in said tear region, a distal end of said tear means being a generally convexly shaped rounded cutter configured as a rounded bump extending from the panel rear surface substrate towards the tear region and the panel front surface convexly outwardly on an outer surface of said rounded bump and concavely outwardly on an inner surface of said rounded bump for reducing the amount of foam to be torn during deployment of the airbag.

16. An automotive panel assembly as claimed in claim 15 wherein said distal end of said tear means is located on a portion of said panel rear substrate surface comprising the deployment door.

17. An automotive panel assembly as claimed in claim 16 wherein the rounded bump on the distal end of said tear means is configured as a continuous closed loop.

18. An automotive panel assembly as claimed in claim 16 wherein the rounded bump on the distal end of said tear means is configured as a plurality of looped cutters spaced along the distal end of said tear means.

* * * * *

UNITED STATES PATENT AND TRADEMARK OFFICE
CERTIFICATE OF CORRECTION

PATENT NO. : 5,533,749
DATED : July 9, 1996
INVENTOR(S) : Timothy J. Leonard et al.

It is certified that error appears in the above-indentified patent and that said Letters Patent is hereby corrected as shown below:

At title page, References Cited, "5,035,444  4/1991" should be
--5,035,444  7/1991--.

At column 1, line 17, "covers; and conceals" should be
--covers and conceals--.

At column 2, line 44, "together witch" should be
--together with--.

At column 3, line 45, "bump cutter extends" should be
--bump cutter 26 extends--.

Signed and Sealed this

Twenty-eighth Day of January, 1997

Attest:

BRUCE LEHMAN

Attesting Officer   Commissioner of Patents and Trademarks